Figure 1:
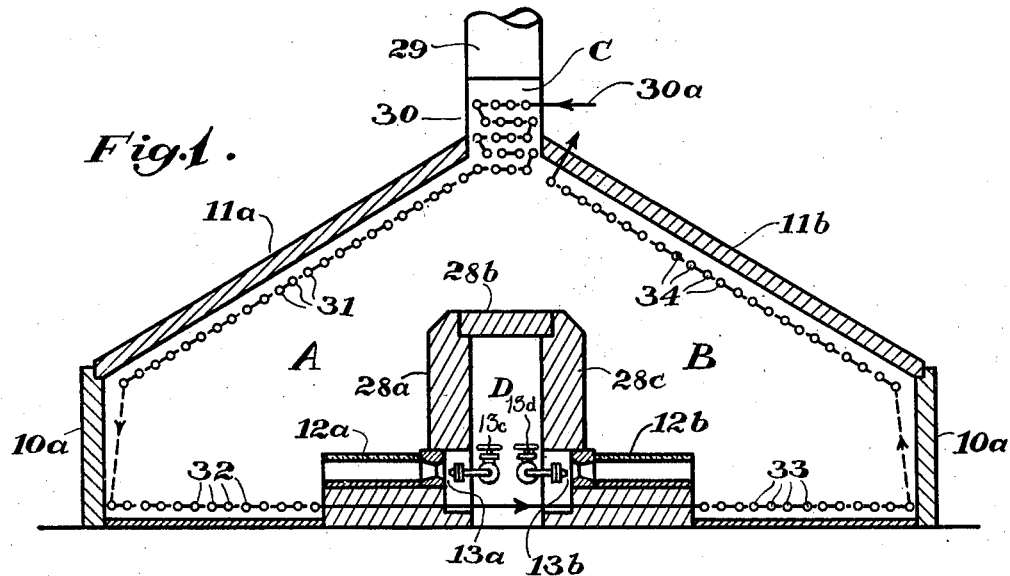

Oct. 10, 1939.      A. E. NASH ET AL      2,175,211
APPARATUS FOR HEATING PETROLEUM
Filed April 20, 1934      2 Sheets-Sheet 1

INVENTORS
Arthur E. Nash
and Franklin E. Shelly
BY
Cornelius L. Ehret
their ATTORNEY.

Patented Oct. 10, 1939

2,175,211

UNITED STATES PATENT OFFICE 2,175,211

APPARATUS FOR HEATING PETROLEUM

Arthur E. Nash, Philadelphia, and Franklin E. Shelly, Jenkintown, Pa., assignors to Alcorn Combustion Company, Philadelphia, Pa., a corporation of Delaware Application April 20, 1934, Serial No. 721,480

10 Claims. (Cl. 196—110)

Our invention relates to systems for effecting transfer of heat to absorption structure including those utilized in heating, distilling or cracking petroleum.

More particularly our invention comprises improvements, modifications and additions to the heat transfer systems disclosed in the copending application of Frank H. Praeger, Serial No. 497,553, filed November 22, 1930 now U. S. Patent 2,129,589, and has as its objects, among others, an increase in the operating efficiency of the system, a greater flexibility in controlling the heating cycle of the system, and a more economical construction of apparatus comprised in the system.

In general, our invention relates to heat transfer systems including a housing structure, means for maintaining therein a plurality of distinct currents of hot combustion gases either in distinct thermal zones or in physically distinct chambers. The apparatus of the system includes also a central chamber traversed by the combined currents of gases. A plurality of heat-absorption structures, such as oil-conducting tubes, are disposed within the housing structure and so related to the plurality of currents of gases as to be heated therefrom, the relationship between the several heat-absorption structures and the currents of gases and other parts of the system being so determined as to control the components of heat transferred from the gases to the absorption structure, as by radiation, convection, or combined radiation and convection, in the several zones or chambers of the system. For example, oil-conducting tubes may be disposed adjacent the wall structure of the housing and largely below and substantially entirely without the current of gases and heated substantially solely by radiation, while other oil-conducting tubes may be located within the central chamber traversed by the combined currents of gases and disposed to be heated mainly by convection.

In accordance with another feature of our invention, certain portion or portions of the wall structure of the heating apparatus are sloped or inclined at an angle to conform approximately to the natural streamline flow of the currents of gases. By the term "wall structure," as used herein, is meant all that structure including the roof, side walls, and/or the floor, the slope or inclination of such portions at times making it indeterminate whether a particular portion of the wall structure is, for example, side wall or roof. By sloping the wall structure of the heating apparatus to conform approximately to the natural flow of the gases through the system, pockets and eddies are avoided and a streamline flow of the combustion gases is induced. The result is, the component of heat transferred to certain of the heat-absorption structures by radiation is increased to a maximum; also, a more uniform distribution of heat transfer per unit area per unit of time throughout the system is obtained, procuring higher average rates of heat transfer per unit area of surface of the heat-absorption structure approaching or substantially equalling the maximum rates of heat transfer per unit area heretofore obtaining in a part only of the heat-absorption structure of a system. The sloping wall structure makes possible also reduction of the total or the actual area of wall structure for a given capacity furnace, thus correspondingly decreasing its construction cost, and the losses of heat from the exterior surfaces of the furnace.

Our invention comprises also introducing the hot combustion gases into the heating apparatus from sources of hot combustion gases adjacent a central heating chamber traversed by the combined currents of gases, which procedure may be termed "center-firing" or "back-firing." This type of firing aids in the more uniform heat distribution throughout the system and in securing a more nearly streamline flow of gases therethrough. In addition, it permits the cooling of certain of the bridge walls or baffles, which define the central heating chamber, and the use of a central air or draft duct, which renders the draft of the heating apparatus largely independent of the direction of the wind.

In accordance with another feature of our invention, the hot burning combustion gases are introduced into the housing through auxiliary combustion chambers or muffles, and these muffles may diverge fan-like to aid in the heating of the side walls of the wall structure to enable them to act as radiant sources.

While our invention comprises heat-absorption structures connected to conduct the oil through the several zones or chambers of the system in any desired sequence, it is more particularly directed to a system which is especially desirable in certain instances; namely, that of conducting the oil serially through all the heat-absorption structures deriving their heat from the plurality of currents of hot burning combustion gases. These several currents of combustion gases may be regulated separately or independently to control the rates of application of heat to the oil in the several zones or chambers of the system, thus providing a flexible system suitable for treating oils of widely variant physical or thermal characteristics.

For a better understanding of our invention, together with other and further features thereof, reference is had to the following description, taken in connection with the accompanying drawings, and its scope will be pointed out in the appended claims.

Figure 2:
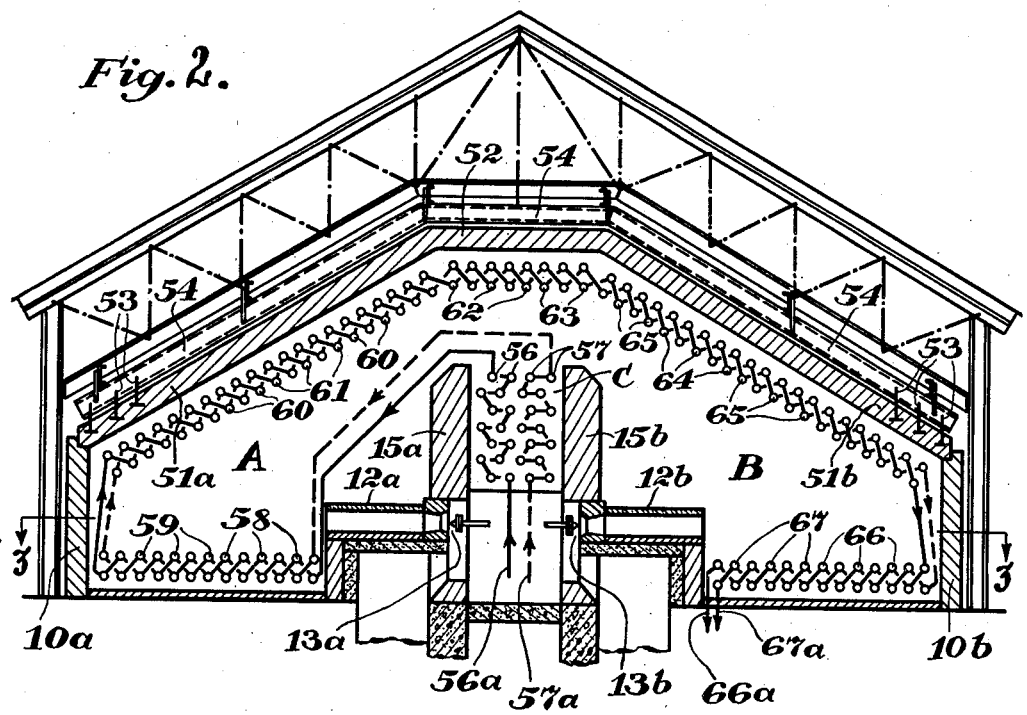
Figure 3:
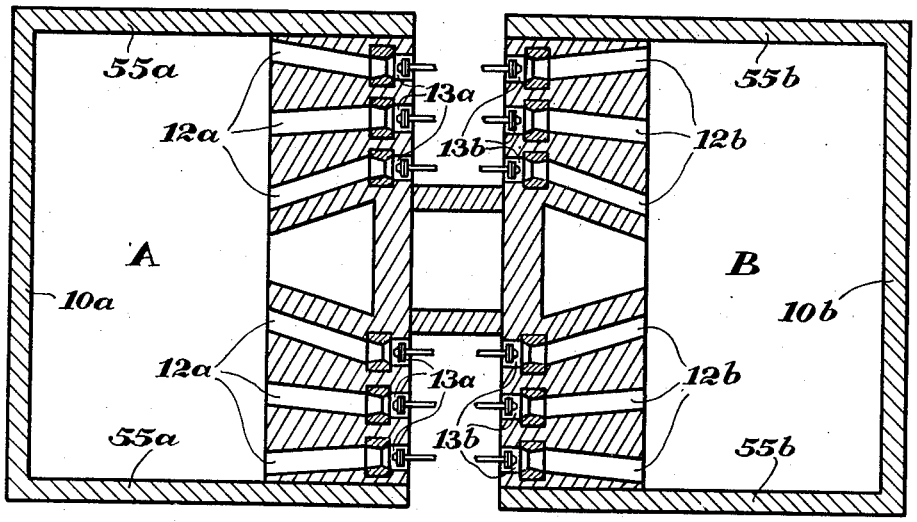

Referring to the drawings, Fig. 1 is a cross-sectional view in elevation of a heat-transfer system embodying our invention in which the oil is passed through all of the heat-absorption structure in series and in which the apparatus is center or back-fired;

Fig. 2 is a cross-sectional view in elevation of a heat-transfer system similar to that of Fig. 1, showing the manner of supporting the wall structure, while Fig. 3 is a cross-sectional plan view along the line 3—3 of Fig. 2.

Referring now more particularly to Fig. 1, there is shown a heat-transfer system comprising three thermally distinct zones or chambers A, B and C. The chamber or zone A is defined by a wall structure including a vertical side-wall portion 10a and a sloping roof portion 11a of firebrick or other suitable refractory material. A current of hot combustion gases is discharged into the chamber A from firing muffles or combustion chambers 12a having top plates and/or walls of highly refractory material, such as silicon carbide. These combustion gases are generated by supplying to the chambers 12a suitable solid or fluid fuel, such as pulverized coal, gas or oil, through burners 13a adjustable as by the valves 13c.

The apparatus shown in Fig. 1 includes the burners 13a and 13b and associated combustion chambers 12a and 12b which are positioned at the center of the apparatus and discharge the hot combustion gases outwardly into the zones A and B. In this modification, baffles or barriers 28a, 28b, 28c form a chamber D through which may be supplied air for cooling the central baffle structure and the air for supporting combustion of the burners 13a, 13b. In this modification, the combined currents of gases from the combustion chambers 12a, 12b pass upwardly through the zone C. In this arrangement, also, the banks of tubes 31, 32, 33 and 34 in the several heating zones or chambers of the furnace comprise a single row adjacent the wall structure of the apparatus. In addition, a bank of tubes 30 is disposed in the chamber C, traversed by the combined currents of gases.

As the combustion gases are discharged from the chambers 12a, 12b, they pass outwardly and upwardly through the chambers A and B, their streamlines conforming approximately to the contour of the wall structure, and thence pass upwardly through the chamber C to the stack 29. The banks of tubes 32 and 33 receive heat substantially solely by radiation, and the tubes 31 and 34 by combined radiation and convection. Similarly, the bank of tubes 30, receiving oil from the line 30a, are heated by convection from the gases passing upwardly through the chamber C into the stack 29, or by combined convection and radiation.

The oil may be passed through the several banks of tubes in the different zones of the furnace, as in the order 30, 31, 32, 33 and 34. With such an arrangement, the heating within the chambers A and B may be separately controlled, by the separately adjustable burner-valves 13c and 13d, to provide a flexibility in the heating cycle of the oil to conform to the particular requirements, as determined by the physical or thermal characteristics of the oil. For example, a moderate initial heating of the oil may be effected in the banks of tubes 31 and 32 in chamber A, followed by intensive heating in the banks of tubes 33 and 34 in chamber B; or, on the contrary, an initial intensive heating may be effected in chamber A followed by moderate continued heating or "soaking" in the chamber B. The separate control of the heating in the chambers A and B by control of the burners 13a, 13b adapts a particular furnace installation to the heat-treating of oils or fluids of widely different physical or thermal characteristics.

The arrangement of the combustion chambers 12a and 12b for center or back-firing effects a more uniform distribution of heat throughout the furnace and a more natural flow of the hot combustion gases.

In the apparatus shown in Figs. 2 and 3, the wall structure of Fig. 1 is modified to comprise the side-wall portions 10a, 10b and sloping roof portions 51a, 51b joined at the top by a horizontal roof portion 52. Fig. 2 illustrates schematically the manner in which such a roof structure may be supported, the supporting means comprising a plurality of hangers 53 engaging the refractory material of the roof portions 51a, 51b and 52 which customarily is supplied in sectionalized blocks or slabs. The hangers 53 depend from girders 54 that form an integral part of the supporting roof truss.

In this arrangement, also, the combustion chambers or muffles 12a, 12b diverge fan-like, as shown clearly in Fig. 3. The currents of combustion gases emerging therefrom impinge upon the side walls 55a, 55b to heat them to radiation temperatures and, at the same time, spread out in a more or less continuous layer which projects outwardly and upwardly, the streamlines conforming approximately to the contour of the wall structure. As shown, two parallel streams of oil are passed in series through the several chambers or zones of the furnace, one path comprising the bank of tubes 56 in the chamber C connected to the incoming line 56a and the banks of tubes 58, 60, 62, 64 and 66 disposed adjacent the wall structure of the furnace and emerging at the line 66a. The other parallel stream flows through the bank of tubes 57 in the convection zone C, from the incoming line 57a, and thence through the banks of tubes 59, 61, 63, 65 and 67, adjacent the wall structure of the apparatus, emerging at the line 67a. The banks of floor tubes 58, 59, 66, and 67 are heated substantially solely by radiation, while the banks of wall tubes or roof tubes 60–65, inclusive, are heated by combined radiation and convection. The arrangement of the tubes for the double flow is such that the oil of the two streams alternately passes in criss-cross flow through the double rows of tubes adjacent the floors and roofs of the fire chambers A and B.

While we have illustrated our invention as embodied in a number of specific apparatus, it will be apparent to those skilled in the art that various features of the several modifications may be combined in any way desired to meet the particular requirements of any system, and that various other changes and modifications may be made without departing from the spirit and scope of our invention, as defined in the appended claims.

What we claim is:

1. Oil-heating apparatus comprising a housing structure embracing a centrally-disposed heating chamber distinct from the rest of the housing structure and within a larger heating chamber embraced by said housing structure, said central chamber dividing said larger chamber into separately fired zones on opposite sides of said central chamber, means associated with said central chamber for directing outwardly therefrom into said larger chamber a plurality of currents of hot combustion gases, said central chamber being traversed by the combined currents of gases, oil-conducting heat-absorption structure disposed in said housing structure without said central chamber, and other oil-conducting heat-absorption structure disposed in said central chamber.

2. Oil-heating apparatus comprising a housing structure embracing a centrally-disposed heating chamber distinct from the rest of the housing structure and within a larger heating chamber embraced by said housing structure, said central chamber dividing said larger chamber into separately fired zones on opposite sides of said central chamber, a plurality of combustion chambers associated with said central chamber for discharging a plurality of currents of combustion gases directed outwardly therefrom into said larger heating chamber, said central chamber being traversed by the combined currents of gases, oil-conducting heat-absorption structure disposed in said housing structure without said central chamber, and other oil-conducting heat-absorption structure disposed in said central chamber.

3. Oil-heating apparatus comprising a housing embracing wall structure, said housing including a centrally-disposed heating chamber distinct from the rest of the housing structure and forming therewith fire chambers on opposite sides of said central chamber, a plurality of combustion chambers associated with said central heating chamber and disposed to discharge a plurality of currents of hot combustion gases away from said central chamber toward said wall structure, said central chamber being traversed by the combined currents of gases, said wall structure including a roof portion sloping upwardly from the outer walls thereof, oil-conducting heat-absorption structure disposed adjacent the floor of said housing below and in advance of the discharge of said combustion chambers, oil-conducting heat-absorption structure disposed adjacent said sloping roof portion, and other oil-conducting heat-absorption structure disposed in said central chamber to be heated by convection from said combined currents of said gases.

4. Oil-heating apparatus comprising a heating chamber, a plurality of combustion chambers arranged substantially in a horizontal plane and disposed to discharge substantially horizontal divergent currents of hot combustion gases into said heating chamber to spread said gases throughout said chamber, and oil-conducting heat-absorption structure disposed in said heating chamber to be heated preponderantly by radiation.

5. Oil-heating apparatus comprising a heating chamber, a plurality of elongated combustion chambers disposed to discharge hot combustion gases into said heating chamber, the axes of said combustion chambers being substantially in a horizontal plane substantially parallel to a horizontal section of said heating chamber and diverging fan-like to spread said gases throughout said heating chamber and against the walls thereof, and oil-conducting heat-absorption structure disposed in said heating chamber to be heated preponderantly by radiation.

6. Oil-heating apparatus comprising a pair of opposed heating chambers having substantially rectangular horizontal sections, a plurality of elongated combustion chambers disposed along one side of each of said heating chambers to discharge hot combustion gases thereinto, the axes of said combustion chambers being in horizontal planes and diverging fan-like to spread said gases throughout said heating chambers and against the walls thereof, oil-conducting heat-absorption structure disposed in each of said heating chambers below the discharge of said combustion chambers to be heated substantially solely by radiation, a third heating chamber intermediate and separating said pair of heating chambers and traversed by the combined currents of gases therefrom, and oil-conducting heat-absorption structure disposed in said third chamber to be heated preponderantly by convection.

7. An oil-heating system comprising a housing structure including a plurality of heating chambers, two of said chambers being disposed end-to-end on opposite sides of a central chamber, a plurality of combustion chambers associated with said central chamber for discharging a plurality of currents of combustion gases directed outwardly and away from said central chamber and into each of said two chambers, said central chamber being traversed by the combined currents of gases from said two chambers, and oil-conducting heat-absorption structure within each of said two chambers disposed below and substantially without the discharge from said combustion chambers to be heated substantially solely by radiation.

8. An oil-heating system comprising wall structure forming two heating chambers disposed end-to-end on opposite sides of a central heating chamber, means located adjacent said central chamber for producing within each of said two chambers currents of hot combustion gases directed toward opposite side walls of said wall structure, said wall structure including roof portions sloping upwardly from said opposite walls in approximate conformity with the natural stream lines of the rising gas currents, said central chamber being traversed by the combined currents of gases from said two chambers, and a plurality of oil-conducting heat-absorbing tubes disposed adjacent said upwardly sloping roof portions, and a plurality of tubes below and without the paths of said currents of gases for absorption of heat substantially solely by radiation.

9. In an oil-heating system the combination of a pair of opposed heating chambers having substantially rectangular horizontal sections, a plurality of elongated combustion chambers disposed along one side of each of said heating chambers to discharge hot combustion gases thereinto, the axes of said combustion chambers being in horizontal planes and diverging fan-like to spread said gases throughout said heating chamber and against the walls thereof, oil-conducting heat-absorption tubes free of radiation-intercepting refractory disposed in each of said heating chambers below the discharge of said combustion chambers to be heated substantially solely by radiation, roof tubes disposed adjacent the roof of each of said heating chambers to be heated by radiation and convection, a third heating chamber intermediate and separating said pair of chambers and traversed by the combined currents of gases therefrom, and oil-conducting heat-absorption structure disposed in said third chamber to be heated by convection from said combined currents of gases.

10. Oil-heating apparatus comprising a pair of opposed heating chambers having substantially rectangular horizontal sections, a plurality of elongated combustion chambers disposed along one side of each of said heating chambers to discharge hot combustion gases thereinto, the axes of said combustion chambers being in horizontal planes and diverging fan-like to spread said gases throughout said heating chamber and against the walls thereof, oil-conducting heat-absorption tubes disposed in each of said heating chambers below the discharge of said combustion chambers to be heated substantially solely by radiation, roof tubes disposed adjacent the roof of each of said heating chambers to be heated by radiation, a third heating chamber intermediate and separating said pair of chambers and traversed by the combined currents of gases therefrom, oil-conducting heat-absorption structure disposed in said third chamber to be heated by convection from said combined currents of gases, and means connecting said tubes for passage of oil first through the tubes in said third chamber and then through the tubes in one end then through the tubes in the other of said pair of heating chambers.

ARTHUR E. NASH.
FRANKLIN E. SHELLY.

CERTIFICATE OF CORRECTION.

Patent No. 2,175,211.  October 10, 1939.

ARTHUR E. NASH, ET AL.

It is hereby certified that error appears in the printed specification of the above numbered patent requiring correction as follows: Page 1, first column, line 35, after the word and comma "example," insert certain; page 4, second column, line 12, claim 10, for "end" read and; and that the said Letters Patent should be read with this correction therein that the same may conform to the record of the case in the Patent Office.

Signed and sealed this 7th day of November, A. D. 1939.

(Seal)

Henry Van Arsdale,
Acting Commissioner of Patents.